United States Patent Office

3,428,425
Patented Feb. 18, 1969

3,428,425
METHOD OF PREPARING SILICA MATERIALS
Ralph Marotta, St. Louis, Mo., assignor to Monsanto Company, St. Louis, Mo., a corporation of Delaware
No Drawing. Filed Apr. 4, 1966, Ser. No. 539,625
U.S. Cl. 23—182          6 Claims
Int. Cl. C01b *33/16;* C09c *1/00*

ABSTRACT OF THE DISCLOSURE

Silica xerogels with a surface area of 300–600 m.$^2$/gm. and linseed oil absorption of about 3–5 cc./gm. and composed of particles of .01–.03 micron, with pore volumes of 0.5–1.0 cc./gm., pore diameters of 35–90 A. and average bulk density of 3–7 lbs./ft. are prepared by the simultaneous addition of alkali metal silicate with mineral acid to a solution maintained at pH less than 6.0, and a temperature less than 50° C. After a substantial part of the reactants have been added the temperature is raised to 70–95° C. and the rest of the reactants added over period of 1–3 hrs. to obtain a slurry containing 3–10% $SiO_2$.

---

This invention relates to finely divided precipitated silica particles and to processes for preparing the same. More particularly, this invention relates to the production of an amorphous, pulverulent silica xerogel which is produced by reacting aqueous alkali metal silicate solutions with an acidification agent. The present invention further relates to novel finely divided silica xerogels having certain unique properties, particularly with respect to surface area and linseed oil absorption characteristics. The novel xerogels of the present invention may be used as a thixotropic agent for thickening greases, reinforcing agent, flowing agent, and insulation; and are generally superior, for these uses, to previously known silica xerogels.

Prior to the present invention, is was known that silica could be prepared by reaction of alkali metal silicate solutions with acids. Some of these prior art processes are referred to hereinafter.

In U.S. Patent 2,731,326, there is described a process in which active silica, i.e., silica having a low degree of polymerization, is alleged to accrete to supercolloidal aggregates having reticulated structures of open-packed, dense, amorphous silica spheroids which are from 5 to 150 millimicrons in diameter, by releasing active silica (which, for example, has been prepared by partially neutralizing a soluble sodium silicate with sulfuric acid in the pH range of 8–11) in an aqueous suspension of the aggregates while maintaining the pH of the suspension at 8–11, an alkali metal ion concentration below 1 normal, and the temperature in the range from 60° C. to 125° C. The release of active silica is stated to be effected at a rate such that the specific surface area of the precipitated silica present decreases and the end products are described as pulverulent, dry gels having a specific area of from 60 to 400 square meters per gram and consist of supercolloidal aggregates of reticulated spheroidal units. The silica spheroids in the structures are so loosely aggregated that the linseed oil absorption, in milliliters (of oil absorbed) per 100 grams of solids, is from 1 to 3 times the specific area, in square meters per gram.

The patentees point out in U.S. 2,731,326 that the xerogels, prepared by the reaction of sodium silicate with an acid followed by drying the wet gel, comprise a product which is hard, highly porous, often chalky or glassy, and which cannot be readily disintegrated mechanically because they consist of ultimate units (<5 m$\mu$ in diameter) which are loosely aggregated. Furthermore, the patentees disclose that the final step of drying the gels to xerogels causes a collapse or shrinkage, i.e. reduction in volume per unit weight, of their structure to close-packed networks. The aforementioned patent contains a description of a process which consists in first preparing an aquasol which serves as a heel for the subsequent additions of solutions of sodium silicate and sulfuric acid, such additions being made at a rate sufficient to maintain the pH of the reaction mixture above 9 and more preferably between 10 and 11, and the temperature of such heel and/or reaction mixture is maintained at 95° C. throughout the entire addition of acid and silicate thereto.

The disadvantages of the aforementioned processes of the patent (2,731,326) are as follows: (1) the final step of dehydration of wet cake to a xerogel results in a significant collapse or shrinkage of the cake; and (2) it is necessary that the wet cake be washed several times with an organic solvent and that the water be completely replaced by such organic solvent. This solvent must then be removed from the filter cake by various heating means in order to obtain a product having a surface area (BET method) of 200 square meters per gram or more. Thus, the removal and recovery of the organic solvent from the wet filter cake results in higher material costs and necessitates the use of equipment involving a significant amount of capital cost.

In U.S. Patent 2,940,830 issued June 14, 1960, to F. S. Thornhill, there is described a process for preparing finely divided precipitated silica which is stated to be suitable as a reinforcing pigment in rubber compositions. Thornhill more specifically describes a process of preparing the aforementioned silica material, which is further characterized by having an average ultimate particle size of 0.015 to 0.04 micron and a surface area of 25 to 200 square meters per gram, by the controlled rate of addition of acid to an alkali metal silicate wherein the resultant slurry is constantly maintained at a pH above 7 in order to achieve the aforementioned end product characteristics. As can readily be seen, the Thornhill patent is strictly directed to the production of a product suitable as a reinforcing agent in rubber compositions.

Canadian Patent 713,984 discloses a method of providing a precipitated silica which is stated to be useful as a reinforcing agent for rubber. More specifically, this patent discloses a process wherein a pool of an aqueous alkali metal silicate solution is established and afterwards an aqueous alkali metal silicate solution and acid are simultaneously added to the pool. The patentee therein points out that this simultaneous addition is continued until the viscosity of the pool rises through a maximum and then falls to a substantially lower value. The amount of the acidification agent and the alkali metal silicate are so proportioned as to maintain the pH of the resulting slurry substantially constant throughout the major portion of the reaction in the range of about 10 to 12. The process is generally conducted at a temperature of 80 to 90° C. and the end product, after drying, usually results in a silica which may have a surface area of 260 square meters per gram and which the patentee points out has been found satisfactory as a reinforcing agent for rubber.

Further disadvantages of the aforementioned prior art reference (Canadian 713,984) relate to the fact that the dehydration of the wet silica cake results in a significant shrinkage, i.e. 50% or greater by volume per unit weight, low surface area, and a high ratio of linseed oil absorption, expressed in milliliters per 100 grams of solids, to specific surface area, expressed in square meters per gram, i.e. a ratio greater than a 1:1. It has been found by the present applicant that the aforementioned properties of such prior art products are not conducive to promoting effective thickening of liquid formulations such as liquid polyester resin and oils and for use as reinforcing fillers, e.g. in silicone rubbers.

The present invention provides, in part, a class of novel silica xerogels which have substantially all the utility and advantages of the previously known silica xerogels, and which, in addition, are substantially free of the undesirable properties and problems accompanying the use of the previously known xerogels. The present invention further provides a novel process which overcomes the aforementioned disadvantages in the prior art processes and results in the production of novel xerogels in a relatively simple, unique, and unobvious manner.

Accordingly, it is one object of the present invention to provide novel, finely divided silica xerogels having certain unique physical and chemical characteristics hereinafter set forth.

It is another object of this invention to provide improved processes for preparing such silica xerogels.

It is a further object of the present invention to provide a unique process for producing a xerogel from a waterwet filter cake without material shrinkage of the wet particles.

It is still another object of the present invention to provide a finely divided, dry, amorphous silica xerogel having certain unique properties, hereinafter defined, which render such xerogel especially useful as a thickening and/or thixotropic agent when incorporated in various organic materials such as oil.

Still further objects and advantages of the present invention will be or become apparent from the following description and the appended claims.

The present invention, in part, provides a pulverulent, dry, silica xerogel having a specific surface area in excess of 300, and preferably in the range of from about 300 to about 600, square meters per gram and having a ratio of linseed absorption (milliliters of oil per 100 grams of xerogel) to such surface area of less than 1:1, e.g. 0.75:1, and preferably in the range of about 0.6:1 to about 0.9:1. Furthermore, the xerogel has an average ultimate particle size of from about 10 to about 30 millimicrons, an average pore volume of from about 0.5 cc./gram to about 1.0 cc./gram, an average pore diameter of from about 35 A. to about 90 A., angstroms, and an average bulk density of from about 3 to about 7 lbs./ft.$^3$.

The term "ultimate particle size" connotates the average particle size measurement of coherent aggregates of ultimate spherical units of the finely divided silica xerogel which has been ground to the smallest size possible. The method used herein for determining or measuring the ultimate particle size of these coherent aggregates is the same as that described in detail by J. H. L. Watson in "Analytical Chemistry," volume 20, p. 576, June 1948.

In brief, the present invention also provides a process which comprises the following steps:

(1) Simultaneously adding an alkali metal silicate solution and an aqueous solution of a mineral acid to an agitated acidic aqueous heel maintained at a temperature below about 50° C., the rate of addition of the acid solution to the heel being such as to maintain the resultant slurry at a pH of less than 6, preferably from about 3.5 to about 5.9;

(2) After a substantial part, i.e. from about 30% to about 85% by weight, preferably from about 50% to about 70% by weight, of the total silicate solution employed has been added, the temperature of the resultant slurry is increased to from about 70° C. to about 95° C.; and (3) Simultaneously feeding the remaining quantity of such silicate solution and sufficient acid to the resultant slurry at such a rate and with sufficient agitation to maintain in such slurry a pH less than 6.0, preferably from about 3.5 to about 5.9, and a temperature of about 70° to about 95° C. The quantity of silicate, acid, and water used is preferably such that the resulting slurry after all the additions have been made thereto contains from about 3 to less than 10% by weight of $SiO_2$, and preferably from about 4% to about 8% by weight of $SiO_2$.

By carrying out such process, silica particles precipitate in the aqueous slurry. After these particles are separated from the slurry and dried, they generally have a surface area for the product of this invention as hereinbefore defined and a ratio of linseed oil absorption (expressed as milliliters per 100 grams) to specific surface area (expressed in square meters per gram) of less than 1:1. In one preferred embodiment, such particles are separated from the slurry by filtration and are dried at a temperature less than 800° C., preferably at a temperature of from about 120° C. to about 750° C.

The silicate feed solution used in the novel process of the present invention may contain any of the various known alkali metal silicates but is preferably an aqueous solution of sodium or potassium silicate, and more preferably sodium silicate. It has been found desirable to use an alkali metal silicate solution which contains a silica to alkali metal oxide mol ratio of from about 3:1 to about 5:1, and more preferably from about 3.25:1 to about 4.0:1 and a silica concentration of from about 25 to about 50 percent by weight $SiO_2$. Such a silicate solution will not require excessive quantities of acid and/or water which present handling problems. There are several commercially available aqueous silicate solutions which contain the aforementioned silica to alkali metal oxide mol ratio and silica concentrations. Such silicate solutions are the preferred ones to be utilized in the practice of the present invention.

Several mineral acids may be employed in the process of the present invention. Examples of mineral acids which have been found especially suitable include phosphoric, nitric, hydrobromic, hydrochloric and sulfuric acids. Of these, hydrochloric and sulfuric acids are preferred, and sulfuric acid is particularly preferred. Of course, any mineral acid other than hydrofluoric acid (which reacts with silica) may be used. The mineral acid solution, utilized in the novel process, should have an acid concentration of less than 10% by weight and preferably from about 4% to about 8% by weight. It is believed that the low mineral acid concentration helps to minimize reaction of high concentrations of the alkali metal silicate solution and such acid, and consequently to achieve the desired and xerogel having the particular characteristics heretofore defined. Furthermore, in order to minimize the effects of localized high acid concentrations, it is preferred that the alkali metal silicate solution and the mineral acid solution be introduced in diametrically opposed parts of the aqueous slurry in order to be quickly diluted with the reaction mixture before localized reactions between high concentrations of the acid and silicate occur. Stated differently, the silicate and acid solutions are preferably added to different parts (or volumes) of the slurry body (which results in dilution of the added solutions) in order to avoid reaction between localized high concentrations of silicate and acid.

The alkali metal silicate solution and the aqueous solution of a mineral acid are simultaneously and controllably fed over an extended period of time as herein described into an acidic aqueous heel. It is important that the aqueous heel employed be in an amount within the range of from about 15 to about 65% by weight, and more preferably from about 30% to about 55% by weight, of the total weight of the reaction slurry (including the heel) after all the alkali metal silicate and mineral acid additions have been made. Such proportions of the aqueous heel also help to prevent high localized concentrations of the silicate and mineral acid solutions during the additions of such solutions, thus minimizing the formation of large gel particles.

As previously mentioned, it is essential that the resultant slurry, formed by the addition of the silicate and mineral acid solutions to the aqueous heel, have a pH less than 6.0 and preferably from about 3.5 to about 5.9. Consequently, it is desirable that the aqueous heel have a pH within the aforementioned range prior to any additions of acid and silicate thereto. Furthermore, it is also essential, in order to obtain the novel xerogel of this invention, that the aqueous heel and the resultant slurry be maintained at a temperature below 50°C., preferably from about 20° C. to about 45° C., during the time that a substantial portion or part of the total silicate solution used is added to the slurry. Specifically, such lower temperatures are maintained until from about 30% to about 85% by weight, preferably from about 50% to about 70%, of the total weight of the alkali metal silicate feed solution employed, has been introduced into the aqueous heel. After such part of the silicate solution is added to said slurry at the aforementioned lower temperatures, the slurry temperature is then raised to from about 70°C. to about 95°C. This may be accomplished by heating the slurry using conventional techniques. While thus increasing the temperature of the slurry, the remainder of the alkali metal silicate feed solution and the mineral acid solution is preferably not fed into the slurry, but the agitation of the slurry is continued. The description contained herein and the experiments hereinafter described are directed to the discontinuation of the silicate and mineral acid feed solution to the slurry during the time that the temperature of the slurry is increased or raised. However, it is to be noted that under certain conditions the silicate and mineral acid solutions may be added to the slurry during the time the temperature of the slurry is being increased, if such addition is carried out at a reduced feed rate, i.g. adding less than 5% by weight of the total silicate solution during the period the temperature is increased. Such alternative is considered to be within the scope of the process of the present invenrtton.

Preferably, after the slurry temperature is increased to 70°C., the remaining quantity of the silicate solution and sufficient acid are fed to the slurry at a rate sufficient to maintain the pH thereof at less than 6.0, preferably at from about 3.5 to about 5.9. The slurry is maintained at the higher temperatures, i.e. from about 70°C. to about 95°C., during the entire time that the remaining portion, i.e. at least 15% by weight of the total silicate solution employed, is fed into the slurry. It also is necessary to carry out the overall (that is, total) silicate addition to the slurry over an extended period of time, preferably from about 1 hour to about 3 hours or more in order to achieve the desired end result, i.e. to achieve a xerogel product having the herein described desirable properties.

These aforementioned steps are generally the critical steps of the process which determine the structure of the end product and enable the formation of a gel structure or network which does not materially collapse or shrink on drying. It has been observed that when from about 10% to about 25% by weight of the total weight of the silicate solution has been fed into the aqueous heel or resultant slurry, almost all of the colloidal silica aggregates in the sol agglomerate and form a soft thixotropic gel slurry within a short period of time. Consequently, it is desirable during this period to continuously or frequently agitate the resultant slurry in order to prevent the possible complete gelling of the total slurry in the reaction vessel.

After all of the alkali metal silicate feed solution has been fed into the resultant slurry, the slurry is aged, without agitation, for a period ranging from about 15 minutes to about 120 minutes or more, preferably from about 30 minutes to about 90 minutes, at a temperature above 80°C. and more preferably from about 85°C. to about 90°C. This aging step aids in the subsequent separation of the silica from the aqueous slurry, for example, by filtration. In those cases where it is desirable to age the aforementioned slurry for a period longer than three hours, then such aging should be carried out at a temperature below 60°C. since there is some tendency for higher temperatures to promote gelling of the entire slurry in situ.

After the aging step is completed, the slurry is then filtered and washed with water, generally with the aid of vacuum or pressure to form a wet cake. At this point, the wet cake obtained normally contains from about 82% to about 87% by weight water and the solid material consists essentially or entirely of silica, i.e. about 18% to 13% $SiO_2$ by weight. It has been observed that if less water is present in the wet cake, the dry silica obtained therefrom will result in having a lower linseed oil absorption than is desired. Furthermore, if more water is present in the wet cake than as hereinbefore specified, the shrinkage of the wet cake incurred during the drying step will be excessive, i.e. greater than 10% by volume, and will result in a product which will be gritty, hard to grind, and exhibit an extremely low linseed oil absorption. All of these properties adversely affect the ability of the silica to thicken liquid organic formulations when the silica is incorporated in such formulations.

The wet cake of silica is next dried at any temperature below 800° C., i.e. below the silica sintering or densification point, and preferably is dried at a temperature within the range of from about 120° C. to about 750° C. Furthermore, the silica wet cake should be dried until the solid formed contains from about 92% to about 97% by weight $SiO_2$. In such instances, the product contains about 8% to 2% by weight of water combined chemically with the silica. If this combined water is removed by prolonged heating, the silica particles acquire a negative electrostatic charge which apparently causes such particles to adhere to surfaces. This charge dissipates, however, when the silica particles pick up moisture again. It should be noted, however, that this negative charge characteristic caused by the molecular dehydration of silica appears to be common to all silica particles produced by the processes of this invention. The particular means used to dry the wet silica cake is not a critical limitation of the process of the present invention and any means may be utilized. However, one means which is somewhat preferred is an oven drier.

The novel xerogel obtained by carrying out the processes of this invention is characterized by being porous, amorphous, and pulverulent, and is further characterized in having a specific surface area in excess of 300 square meters per gram and generally in the range of from 300 to 600 square meters per gram. In addition, the ratio of the linseed oil absorption number, measured in the manner hereinafter described and expressed in milliliters per 100 grams, to the specific surface area, which is expressed in square meters per gram, is less than 1:1. The average ultimate particle size of the novel xerogels is normally in the range of from about 10 to about 30 millimicrons. The other xerogel characteristics have been previously mentioned, and will not be repeated for the sake of brevity.

One of the most novel aspects of the dried silica cake or xerogel is that such a xerogel has substantially the same volume, per unit weight, as the silica particles initially formed in the slurry and still has substantially the same size pores as are present in the silica particles in the slurry, that is, prior to drying.

The dried, substantially nonshrunken silica xerogel may be utilized in such form for the various uses or purposes hereinbefore referred to, or such xerogel may be comminuted, that is, ground up, by various means such as a micronizer or a fluid energy mill and then subsequently used for thickening or other purposes.

A further understanding of the processes of this invention will be obtained from the following specific examples which are intended to illustrate the invention, but not to limit the scope thereof, parts and percentages being by weight unless otherwise specified.

EXAMPLE I

Into a 50 gallon stainless steel Pfaudler reactor jacketed for steam heating and water cooling was charged approximately 16.2 gallons of an acidic (pH 3.5) aqueous solution (prepared by adding $H_2SO_4$ to 40° C. water until the desired pH was obtained) to serve as a heel of acidic solution. To this heel, which was continuously agitated, there was added, concurrently, (1) 17,720 cc. of a sodium silicate solution having a silica concentration of 29.2% $SiO_2$ and a mol ratio of $SiO_2/Na_2O$ of 3.25/1 and (2) 46,925 cc. of an aqueous or water sulfuric acid solution containing 7.0% by weight $H_2SO_4$; these two solutions were fed into the heel over an extended period of time, i.e. 160 minutes, as shown in Table I. The heel or resultant slurry was initially maintained at a temperature of 40° C. and at a pH of about 3.5 which pH value was maintained by the rate at which the acid solution was fed into the heel. The contents of the reactor were agitated sufficiently during the aforementioned addition to insure rapid dispersion of the silicate and acid solutions through the remaining liquid phase in the reactor. After approximately 58% by weight, of the total weight of the silicate solution finally employed, had been fed into the aqueous heel, the feeding of the silicate and acid solutions was discontinued but agitation was continued, and the temperature of the aqueous heel or resultant slurry was increased from 40° C. to 90° C. by heating the slurry by means of the aforementioned steam heating jacket. When the temperature of the slurry reached 90° C. the remaining 42% by weight of the silicate feed solution was fed, with agitation, into the reactor simultaneously with the sulfuric acid solution described above, the rate of addition of the two solutions being controlled so as to maintain the resultant slurry at a pH of 3.5.

After 160 minutes, all of the silicate feed solution had been fed into the reactor. The resultant slurry was then aged, without agitation, at 90° C. for approximately 100 minutes; thereafter, the batch was filtered through a Twill-Type S cloth positioned in a stainless Buchner type filter which was maintained at about 25 inches Hg vacuum. A filter cake, which constituted the silica xerogel product, collected on the aforementioned cloth. After the filtration was finished, the cake was washed with 24 gallons of water, keeping a layer of water constantly on the cake in order to prevent cracking. Finally, the cake was sucked as dry as possible by tapping the surface with a wooden trowel for 15 minutes in order to prevent or to close up any cracks which started to form. The resulting 2⅝-inch thick wet cake was cut up into several portions and one portion was then placed on a tray and dried in an oven at a temperature of 130° C. After drying, various analyses were conducted on the xerogel materials.

The data relating to this run (designated No. 1) and the results obtained therefrom are set forth in Table 1.

TABLE I.—RUN NO. 1

| Time, min. (cumulative): | Aqueous Heel [1] or slurry Temp., °C. | pH | $Na_2SiO_3$ Added, cc. (cumulative) | $H_2SO_4$ [2] Added, cc. (cumulative) |
|---|---|---|---|---|
| 0 | 39 | 3.50 | 0 | 0 |
| 5 | 40 | 3.45 | 738 | 1,955 |
| 10 | 40 | 3.45 | 1,476 | 3,910 |
| 15 | 40 | 3.50 | 2,214 | 5,865 |
| 20 | 39.5 | 3.50 | 2,953 | 7,820 |
| 25 | 39.5 | 3.50 | 3,691 | 9,776 |
| 30 | 40 | 3.60 | 4,429 | 11,731 |
| 35 | 40 | 3.40 | 5,168 | 13,686 |
| 40 | 40 | 3.50 | 5,906 | 15,641 |
| 45 | 40 | 3.50 | 6,644 | 17,596 |
| 50 | 40 | 3.50 | 7,383 | 19,552 |
| 55 | 40 | 3.45 | 8,121 | 21,507 |
| 60 | 40 | 3.50 | 8,859 | 23,462 |
| 65 | 40 | 3.50 | 9,597 | 25,417 |
| 70 | 40 | 3.50 | 10,336 | 27,372 |
| * | | | | |
| 110 | 89 | 3.45 | 10,336 | 27,372 |
| 115 | 90 | 3.45 | 11,074 | 29,328 |
| 120 | 90 | 3.50 | 11,812 | 31,283 |
| 125 | 89.5 | 3.60 | 12,551 | 33,238 |
| 130 | 89.5 | 3.50 | 13,289 | 35,193 |
| 135 | 90 | 3.50 | 14,027 | 37,148 |
| 140 | 90 | 3.50 | 14,766 | 39,104 |
| 145 | 90 | 3.50 | 15,504 | 41,059 |
| 150 | 90 | 3.60 | 16,242 | 43,014 |
| 155 | 90 | 3.55 | 16,980 | 44,969 |
| 160 | 89.5 | 3.50 | 17,720 | 46,925 |
| 160–260 | Aged slurry containing 6% by weight $SiO_2$ for 100 minutes at 90° C., washed, vacuum dried, and oven dried at 130° C. | | | |

[1] 16.2 gal. water=46.2% by weight of total material in reactor after all additions.
[2] 7.0% by weight $H_2SO_4$ in an aqueous solution.
*The broken line indicates the conditions existing when the addition of silicate and acid solutions was temporarily interrupted and the temperature of the slurry was increased from 40° C to 89° C.

XEROGEL CHARACTERISTICS

Wet Cake

83% $H_2O$
17% $SiO_2$
2⅝" thick

Dry Cake

Linseed oil absorption (LOA)—304 ml./100 gms.
Specific surface area (SSA)—362 square meters/gm.
(BET—by nitrogen absorption)
LOA/SSA ratio=0.84:1
Percent solids, by weight—97% $SiO_2$
Average ultimate particle size—23 m$\mu$
Bulk density—4.68 lb/ft.$^3$
(Based on weight of 100 cc. xerogel poured into 100 cc. graduate which was preweighed and reweighed after being filled)
Pore volume=0.76 cc./gram
Average pore diameter=84 A.

The linseed oil absorption number was obtained by the procedure set forth in the article "Oil Absorption of Pigments," ASTM Standards, 1955 Part IV, p. 197. The specific surface area of the end product was determined by the nitrogen absorption method described by Brunauer, Emmett, and Teller (BET) in the "Journal of the American Chemical Society," volume 60, p. 309, published in 1938. The bulk density was determined by pouring a 100 cc. sample of the product, after it was ground in a mortar with a pestle, into a 100 cc. graduated cylinder which had been preweighed and then the cylinder containing said product was reweighed and the loose bulk density computed from these measurements.

Three separate portions of the wet cake obtained in the aforementioned Run No. 1 were placed on separate trays and were dried at temperatures of 140° C., 300° C., and 700° C., respectively, in separate ovens. There was no substantial or significant change in the physical and/or chemical properties of the resulting materials when dried at these different temperatures as compared to the material dried at 130° C.

EXAMPLE II

A second run was made in a similar manner and utilizing the same equipment and technique as set forth in Example I with the following exceptions. The acidic aqueous heel or resultant slurry initially was maintained at a temperature of 30° C. and at a pH of 4.5 utilizing an 8% by weight sulfuric acid solution. The 16,980 cc. of feed solution was potassium silicate containing 28.2% $SiO_2$ and having a mol ratio of $SiO_2/K_2O$ of 4.0:1. After 70 minutes had lapsed and 62% by weight, based on the total weight of the feed solution of the silicate solution, had been fed into the reactor, the feeding of the silicate and acid solutions was discontinued. The temperature of the resultant slurry was then increased from 30° C. to and maintained thereafter at approximately 80° C. After this, the remaining 38% by weight of the feed solution was fed into the slurry along with the acid solution to keep the pH at 4.5. The results of Run No. 2 are shown in Table II.

TABLE II.—RUN NO. 2

| Time, min. (cumulative): | Aqueous Heel[1] or slurry Temp., °C | pH | $K_2SiO_3$ Added, cc. (cumulative) | $H_2SO_4$[2] Added, cc. (cumulative) |
|---|---|---|---|---|
| 0 | 30 | 4.50 | 0 | 0 |
| 5 | 30 | 4.35 | 738 | 1,902 |
| 10 | 30.5 | 4.35 | 1,476 | 3,804 |
| 15 | 30.5 | 4.40 | 2,214 | 5,706 |
| 20 | 30.0 | 4.45 | 2,953 | 7,608 |
| 25 | 30.0 | 4.45 | 3,691 | 9,510 |
| 30 | 29.5 | 4.50 | 4,429 | 11,412 |
| 35 | 29.0 | 4.50 | 5,168 | 13,314 |
| 40 | 29.5 | 4.50 | 5,906 | 15,216 |
| 45 | 30.0 | 4.50 | 6,644 | 17,118 |
| 50 | 30.0 | 4.55 | 7,383 | 19,020 |
| 55 | 30.0 | 4.50 | 8,121 | 20,922 |
| 60 | 30.0 | 4.50 | 8,959 | 22,824 |
| 65 | 30.0 | 4.50 | 9,597 | 24,726 |
| 70 | 30.0 | 4.50 | 10,336 | 26,628 |
| * | | | | |
| 90 | 78.0 | 4.45 | 10,336 | 26,628 |
| 95 | 78.5 | 4.55 | 11,812 | 30,432 |
| 100 | 79.0 | 4.55 | 12,551 | 32,334 |
| 105 | 79.0 | 4.50 | 13,289 | 34,236 |
| 110 | 80.0 | 4.50 | 14,027 | 36,138 |
| 115 | 80.0 | 4.55 | 14,766 | 38,040 |
| 120 | 80.5 | 4.55 | 15,504 | 39,942 |
| 125 | 80.0 | 4.50 | 16,242 | 41,844 |
| 130 | 80.0 | 4.50 | 16,720 | 43,746 |
| 135 | 80.0 | 4.50 | 16,980 | 45,850 |
| 135–255 | Aged slurry containing 8% by weight $SiO_2$ for 120 minutes at 85° C., washed with water, vacuum dried and oven dried at 140° C. | | | |

[1] 16.5 gal. water=47.8% by weight of the total material in reactor after all additions.
[2] 8.0% by weight $H_2SO_4$ in an aqueous solution.
*The broken line indicates the conditions existing when the addition of silicate and acid solutions was temporarily interrupted and the temperature of the slurry was increased from 30° C. to 78° C.

XEROGEL CHARACTERISTICS

Wet Cake
86% $H_2O$
14% $SiO_2$
1⅞" thick

Dry Cake

Linseed oil absorption (LOA)—321 ml/100 gms.
Specific surface area (SSA)—499 square meters/gm.
(BET—by nitrogen absorption)
LOA/SSA ratio=0.64:1
Percent solids, by weight—95% $SiO_2$
Average ultimate particle size—15 m$\mu$
Bulk density—4.95 lb./ft.$^3$
(Based on weight of 100 cc. xerogel poured into 100 cc. graduate which was preweighed and reweighed after being filled)
Pore volume=0.69 cc./gram
Average pore diameter=55 A.

EXAMPLE III

A third run was conducted in a similar manner and utilizing the same equipment and technique as set forth in Examples I and II with the following exceptions. The acidic aqueous heel or resultant slurry was initially maintained at a temperature of 20° C. and at a pH of 5.5 utilizing an 8% by weight aqueous sulfuric acid solution. The 17,720 cc. of feed solution was sodium silicate containing about 31% $SiO_2$ (by weight) and having a mol ratio of $SiO_2/Na_2O$ of 3.25/1. After 75 minutes had lapsed and approximately 63% by weight, based on the total weight of the sodium silicate feed solution, had been fed into the reactor, the feeding of the silicate and acid solutions was discontinued. The temperature of the resultant slurry was then increased from 20° C. to and maintained thereafter at 70° C. Subsequently, the remaining 37% by weight of the sodium silicate feed solution was injected into the reactor simultaneously with the sulfuric acid solution which was added at a rate sufficient to maintain the pH therein at 5.5. The results of Run No. 3 are illustrated in Table III.

TABLE III.—RUN NO. 3

| Time, min. (cumulative): | Aqueous Heel[1] or slurry Temp., °C | pH | $Na_2SiO_3$ Added, cc. (cumulative) | $H_2SO_4$[2] Added, cc. (cumulative) |
|---|---|---|---|---|
| 0 | 20.0 | 5.50 | 0 | 0 |
| 5 | 20.0 | 5.50 | 738 | 1,947 |
| 10 | 20.0 | 5.50 | 1,476 | 3,894 |
| 15 | 20.5 | 5.50 | 2,214 | 5,841 |
| 20 | 20.5 | 5.50 | 2,953 | 7,788 |
| 25 | 19.5 | 5.45 | 3,691 | 9,736 |
| 30 | 19.5 | 5.45 | 4,429 | 11,683 |
| 35 | 20.0 | 5.55 | 5,168 | 13,630 |
| 40 | 20.5 | 5.50 | 5,906 | 15,577 |
| 45 | 20.0 | 5.50 | 6,644 | 17,524 |
| 50 | 20.0 | 5.45 | 7,383 | 19,472 |
| 55 | 20.0 | 5.50 | 8,121 | 21,419 |
| 60 | 20.0 | 5.50 | 8,859 | 23,366 |
| 65 | 20.0 | 5.50 | 9,597 | 25,313 |
| 70 | 20.0 | 5.50 | 10,336 | 27,260 |
| 75 | 20.0 | 5.50 | 11,074 | 29,208 |
| * | | | | |
| 95 | 69.0 | 5.50 | 11,074 | 29,208 |
| 100 | 70.0 | 5.45 | 11,812 | 31,155 |
| 105 | 70.5 | 5.55 | 12,551 | 33,102 |
| 110 | 70.5 | 5.50 | 13,289 | 35,049 |
| 115 | 70.0 | 5.50 | 14,027 | 36,996 |
| 120 | 70.0 | 5.50 | 14,766 | 38,944 |
| 125 | 70.0 | 5.45 | 15,504 | 40,891 |
| 130 | 70.0 | 5.45 | 16,242 | 42,838 |
| 135 | 71.0 | 5.50 | 16,980 | 44,785 |
| 140 | 72.0 | 5.55 | 17,720 | 46,732 |
| 140–215 | Aged slurry containing 7% by weight $SiO_2$ for 75 minutes at 95° C., washed with water, vacuum dried and oven dried at 127° C. | | | |

[1] 16.3 gal. water=45.8% by weight of total material in reactor after all additions.
[2] 8.1% by weight $H_2SO_4$ in an aqueous solution.
*The broken line indicates the conditions existing when the addition of silicate and acid solutions was temporarily interrupted and the temperature of the slurry was increased from 20° C. to 69° C.

XEROGEL CHARACTERISTICS

Wet Cake
85% $H_2O$
15% $SiO_2$
2⅜" thick

Dry Cake

Linseed oil absorption (LOA)=358 ml./100 gm.
Specific surface area (SSA)=586 square meters/gm.
(BET—by nitrogen absorption)
LOA/SSA ratio=0.63:1
Percent solids, by weight—96% $SiO_2$
Average ultimate particle size=28 m$\mu$
Bulk density=5.06 lb./ft.$^3$
(Based on 100 cc. xerogel poured into 100 cc. graduate which was preweighed and reweighed after being filled)
Pore volume=0.85/cc. gram
Average pore diameter=58 A.

By practicing the novel process as exemplified in the aforementioned Examples I through III, it can readily be seen then that the desired end product (hereinbefore described) is obtained. As previously pointed out, one of the most important steps in the overall process is the initial addition of a substantial part of the alkali metal silicate solution employed (preferably 30 to 80% by weight of the total used) to an acidic aqueous heel which is maintained at a temperature below 50° C. and at a pH below 6.0. It is believed that during this initial step that a large number of sub-microscopic silica nuclei are formed thus providing nuclei or sites for the additional accretions thereon of silica which is precipitated in the slurry and builds up as a coating or layer on the silica nuclei or sites already present in the reaction mixture. This buildup consequently strengthens and agglomerates the silica particles in place with the smallest amount of shrinkage. It is also to be noted that another critical part of the overall reaction is the feeding of the remainder (that is, about 15 to about 70% by weight) of the silicate solution into the heel after the heel has been heated to a temperature range of from about 70° C. to about 95°C. This latter step, it is believed, further agglomerates the silica particles and completes the polymerization thereof. This procedure is believed to prevent the subsequent collapse of the structure on drying and yields a porous silica easily crushed by pneumatic or mechanical action. It is not intended however, that this invention be limited by the aforementioned theory or any other theory.

While the present novel process has generally been described with reference to the interrupted feeding of the silicate and acid solutions to the acidic aqueous heel after 30% to about 85% by weight of the silicate solution has been fed into the slurry at temperatures below 50° C., it is to be noted as previously mentioned that it is also within the scope of the invention to feed some of the silicate and acid solutions to said heel while the temperature is being raised from below 50° C. to the higher temperatures of from about 70° C. to about 95° C. However, at least 15% by weight of the total silicate solution employed must be fed into the acidic heel at the higher temperatures in order to promote the particle agglomerating action and the completion of the polymerization. However, it is preferred that the interrupted silicate feeding technique described in the examples be used. Thus, three variables—slurry pH, temperature, and silica concentration—are generally critical in the practice of the novel process as previously described herein.

It was observed after drying each of the wet silica cakes produced by Examples I through III that the shrinkage, i.e., percent loss of unit volume of the product upon removal of the water from the wet cake, was substantially negligible, i.e. less than 10%. Specifically, the average shrinkage loss by volume per unit weight amounted to about 5% which has never been obtained heretofore, to my knowledge, by the prior art using a precipitated silica procedure. Since the shrinkage of the wet cake is directly correlated to the specific surface area and linseed oil absorption number, it can readily be seen that the novel products obtained herein are characterized by a very high specific surface area, and a linseed oil absorption to specific surface area ratio of less than 1:1.

While the novel processes of the present invention are generally directed to the washing of the wet cake with water and the subsequent drying of the water-containing wet cake, it is also within the scope of the present invention to employ an organic alcohol such as, for example, ethyl alcohol and butyl alcohol to wash the cake and consequently dry the alcohol-containing wet cake to obtain the desired xerogel. (However, this employment of an organic liquid or alcohol is not necessary to obtain the present invention xerogel.) Part of the wet cake obtained from Example I was washed with ethanol and dried under conditions similar to those set forth in Example I. The xerogel obtained exhibited properties similar to the xerogel described in Table I. However, the specific surface area was 404 square meters per gram and the linsed oil absorption was 326 milliliters per 100 grams thus yielding a LOA/SSA ratio equal to 0.807:1.

The novel silica products or xerogels produced by practicing the process of the present invention were tested as thickeners for lubricating oils in the formation of a lubricating grease and the resulting grease was found to be generally superior to a comparable grease prepared from other precipitated silica materials or xerogels commerically available in the following respects: (1) good mechanical stability, (2) superior stability to working with water, (3) water-resistance, and (4) improved thermo-stability.

What is claimed is:

1. The process of preparing an amorphous, pulverulent, dry silica xerogel having a specific surface area in excess of 300 square meters per gram and having a ratio of linseed oil absorption, expressed in milliliters per 100 grams of said xerogel, to specific surface area, expressed in square meters per gram, of less than 1:1 which process comprises simultaneously feeding an alkali metal silicate solution and an aqueous solution of a mineral acid other than hydrofluoric acid to an agitated acidic aqueous heel maintained at a temperature below about 50° C., the rate of addition of said silicate and acid to said heel being sufficient to maintain the resultant slurry at a pH less than 6.0; increasing and maintaining the temperature of such slurry to that in excess of 50° C., after a substantial part of said silicate solution has been added; simultaneously feeding the remaining quantity of said silicate solution and sufficient mineral acid solution to the so heated slurry at such a rate and with sufficient agitation to maintain the pH thereof less than 6.0 whereby there is precipitated a silica material which when dried has the aforementioned ratio of linseed oil absorption to surface area; separating the wet precipitated silica from the slurry; and drying the freshly precipitated silica at a temperature less than 800° C.

2. The process as set forth in claim 1 wherein the alkali metal silicate is sodium silicate having a mol ratio of $SiO_2:Na_2O$ of from about 3:1 to about 5:1 and the mineral acid is sulfuric acid.

3. The process as set forth in claim 1 wherein the part of said silicate fed to the slurry initially maintained at a temperature less than 50° C. is in the range of from about 50% to about 70% by weight of the total weight of silicate feed solution employed; the concentration of the mineral acid solution employed is less than 10% by weight, and the amount of water in the aqueous heel is in the range of from about 15% to about 65% by weight of the total weight of the reaction slurry after all the additions have been made thereto.

4. The process of preparing an amorphous, pulverulent, dry silica xerogel having a specific surface area of from about 300 to about 600 square meters per gram, an average pore volume of from about 0.50 cc./gram to about 1.0 cc./gram, an average pore diameter of from about 35 to about 90 angstroms, an average bulk density of from about 3 to about 7 pounds per cubic foot, and a ratio of linseed oil absorption expressed in milliliters per 100 grams of said xerogel, to specific surface area, expressed in square meters per gram, of less than one, which process comprises simultaneously feeding a sodium silicate solution containing from about 25% to about 45% by weight $SiO_2$ and having a mol ratio of $SiO_2:Na_2O$ of from about 3.25:1 to about 4:1 and an aqueous sulfuric acid solution having a concentration of from about 4% to about 8% by weight $H_2SO_4$ to a continuously agitated acidic aqueous heel maintained at a temperature of from about 20° C. to about 45° C., the rate of addition of said silicate and acid solutions to the aqueous heel being sufficient to maintain the resultant slurry at a pH of from about 3.5 to about 5.9; discontinuing the addition of said solutions after from about 50% to about 70% by weight of the total weight of the silicate solution employed in said process has been fed into said aqueous heel; increasing the temperature of the resultant slurry to from about 70° C., to about 95° C. and thereafter maintaining such temperature; feeding the remaining silicate solution and an additional quantity of sulfuric acid solution, at such rate and with sufficient agitation, to the so heated slurry to maintain the pH thereof at from about 3.5 to about 5.9; aging said slurry, without agitation, after all additions have been made thereto for about 15 minutes to about 120 minutes; filtering said slurry; and drying the collected, freshly precipitated silica material at a temperature of from about 120° C. to about 750° C. until the dried product contains from about 92 to about 97% by weight of $SiO_2$; the amount of water in the initial aqueous heel being in the range of from about 30% to about 55% by weight of the overall reaction slurry weight after all the additions have been made thereto.

5. The process as set forth in claim 4 wherein the total time required to feed all of the sodium silicate solution into the slurry is from about 1 hour to about 3 hours; and the filtered slurry produces a wet cake containing from about 82% to about 87% by weight water, the remainder being $SiO_2$.

6. A porous, substantially liquid-free silica xerogel having a volume, per unit weight substantially the same as that of the same unit weight, on a dry basis, of material initially formed in an aqueous medium and having substantially the same size pores as the water containing xerogel from which it is formed, the xerogel being further characterized by having a specific surface area in excess of 300 square meters per gram, and being composed of silica particles having an average ultimate particle size of from about 10 to about 30 millimicrons, an average pore volume of from about 0.50 cc./gram to about 1.0 cc./gram, an average pore diameter of from about 35 to about 90 angstroms, and an average bulk density of from about 3 to about 7 pounds per cubic foot.

References Cited

UNITED STATES PATENTS

| | | | |
|---|---|---|---|
| 2,940,830 | 6/1960 | Thornhill | 23—182 |
| 3,235,331 | 2/1966 | Nauroth et al. | 23—182 |
| 3,243,262 | 3/1966 | Carr | 23—182 |

FOREIGN PATENTS

| | | |
|---|---|---|
| 946,433 | 8/1956 | Germany. |
| 1,168,874 | 4/1964 | Germany. |

EARL C. THOMAS, *Primary Examiner.*

ARTHUR J. GREIF, *Assistant Examiner.*

U.S. Cl. X.R.

106—309

UNITED STATES PATENT OFFICE
CERTIFICATE OF CORRECTION

Patent No. 3,428,425   Dated February 18, 1969

Inventor(s) Ralph Marotta

It is certified that error appears in the above-identified patent and that said Letters Patent are hereby corrected as shown below:

Column 9, line 47, under Table II, Run No. 2, last column of figures, the figure shown is "45,850", it should read --45,650--

SIGNED AND SEALED
AUG 11 1970

(SEAL)
Attest:

Edward M. Fletcher, Jr.
Attesting Officer

WILLIAM E. SCHUYLER, JR.
Commissioner of Patents